(12) United States Patent
Hamatsuka

(10) Patent No.: US 8,851,877 B2
(45) Date of Patent: Oct. 7, 2014

(54) DIE FOR EXTRUSION FORMING OF HONEYCOMB FORMED BODY, AND METHOD OF FORMING HONEYCOMB FORMED BODY

(75) Inventor: Kazuhiko Hamatsuka, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1380 days.

(21) Appl. No.: 12/510,743

(22) Filed: Jul. 28, 2009

(65) Prior Publication Data

US 2009/0311470 A1    Dec. 17, 2009

Related U.S. Application Data

(63) Continuation of application No. PCT/JP2008/051466, filed on Jan. 24, 2008.

(30) Foreign Application Priority Data

Feb. 1, 2007    (JP) .................................. 2007-023566

(51) Int. Cl.
| | |
|---|---|
| *B28B 3/26* | (2006.01) |
| *B29C 47/12* | (2006.01) |
| *B01D 46/24* | (2006.01) |
| *B29C 47/20* | (2006.01) |
| *B29L 31/60* | (2006.01) |
| *B29C 47/00* | (2006.01) |

(52) U.S. Cl.
CPC ............... *B28B 3/269* (2013.01); *B29C 47/12* (2013.01); *B29C 47/20* (2013.01); *B29L 2031/60* (2013.01); *B29C 47/0028* (2013.01); *B01D 46/247* (2013.01)
USPC ........ 425/380; 264/177.12; 425/461; 425/467

(58) Field of Classification Search
CPC ...... B28B 3/269; B29C 47/0028; B29C 47/12

USPC ...................... 425/380, 461, 467; 264/177.12
See application file for complete search history.

(56) References Cited

U.S. PATENT DOCUMENTS

| | | | |
|---|---|---|---|
| 4,381,912 A | 5/1983 | Yamamoto et al. | |
| 4,384,841 A | 5/1983 | Yamamoto et al. | |
| 5,514,446 A | 5/1996 | Machida et al. | |
| 6,287,103 B1 * | 9/2001 | Miyazaki | 425/131.1 |
| 2002/0185776 A1 | 12/2002 | Shibagaki et al. | |
| 2005/0118296 A1 | 6/2005 | Kaneko et al. | |
| 2007/0026188 A1 * | 2/2007 | Bookbinder et al. | 428/73 |

FOREIGN PATENT DOCUMENTS

| | | |
|---|---|---|
| EP | 0294106 A2 | 12/1988 |
| EP | 0997246 A2 | 5/2000 |
| JP | A-57-77521 | 5/1982 |

(Continued)

OTHER PUBLICATIONS

Jun. 6, 2012 European Search Report issued in European Patent Application No. 08704219.8.

*Primary Examiner* — Yogendra Gupta
*Assistant Examiner* — Joseph Leyson
(74) *Attorney, Agent, or Firm* — Oliff PLC

(57) ABSTRACT

Provided is a die for extrusion forming for extrusion forming of a honeycomb formed body comprising a honeycomb forming die having a structure that there is provided at a surface a groove-like slit in a form of a cell block as well as there is provided at a backside a clay introduction hole in communication with the slit, and a frame-shaped presser plate that is disposed at an outer peripheral portion of the honeycomb forming die and that regulates a shape and dimension of a honeycomb formed body. Among the cell blocks, in an extrusion direction of forming clay, a cell block which end face is positioned to be overlapped with an inner circumferential surface of the presser plate is formed to be shorter than the other cell blocks resided inside the inner circumferential surface of the presser plate.

8 Claims, 6 Drawing Sheets

(56) References Cited

FOREIGN PATENT DOCUMENTS

| JP | A-7-246341 | 9/1995 |
| JP | A-2001-300922 | 10/2001 |
| JP | A-2003-285308 | 10/2003 |
| JP | A-2005-007218 | 1/2005 |
| JP | A-2006-281537 | 10/2006 |

* cited by examiner

EXTRUSION DIRECTION

EXTRUSION DIRECTION

PRIOR ART

EXTRUSION DIRECTION

EXTRUSION DIRECTION

DIE FOR EXTRUSION FORMING OF HONEYCOMB FORMED BODY, AND METHOD OF FORMING HONEYCOMB FORMED BODY

This application is a continuation application of PCT Application No. PCT/JP2008/051466, filed Jan. 24, 2008, and claims priority to Japanese Patent Application No. 2007-023566 filed Feb. 1, 2007.

TECHNICAL FIELD

The present invention relates to a die for extrusion forming preferably for use in extrusion forming of a honeycomb formed body, a method of forming a honeycomb formed body using the die for extrusion forming and a honeycomb formed body to be obtained by the forming method.

BACKGROUND ART

Since in an exhaust gas to be exhausted from an internal combustion engine such as a diesel engine, there is contained large amounts of particulates (particulate matter) whose main component is carbon to be the cause of environmental pollution, it is general to mount a filter for collecting (filtering) particulates in these exhaust systems.

Normally, as a filter to be used for such purpose, as is illustrated in FIGS. 6A and 6B, used is a plugged honeycomb structure 31 including a honeycomb structure 32 in which a plurality of cells 39 in communication between two end faces are defined and formed by a porous partition wall 37, and plugged parts 40 disposed in checker board patterns that are complementary between one end face side and the other end face side of the honeycomb structure 32 so that either one of two open ends of each of the cells 39 is plugged.

An exhaust gas flows in an internal part from one end face 33 of a filter that is formed of such plugged honeycomb structure 31, after having removed particulates and the like that are contained in the gas, and flows out from the other end face 35. In specific, first an exhaust gas flows in a cell 39b which end portion is not plugged at one end face 33 of this filter and which end portion is plugged at the other end face 35, penetrates a porous partition wall 37, moves to a cell 39a which end portion is plugged at one end face 33 and which end portion is not plugged at the other end face 35, and exhausted from this cell 39a. Furthermore, on this occasion, the partition wall 37 functions as a filter layer, and particulates in the gas are caught at the partition wall 37 and accumulated on the partition wall 37.

As a method of manufacturing the above-mentioned plugged honeycomb structure, known is a method in which after a transparent sheet and the like is adhered onto an end face of the honeycomb formed body and the end face is imaged, the position of each cell is recognized by image processing of the image having been shot, and based thereon, punching is made by e.g., laser machining in the position corresponding to the cell to be plugged of the sheet. Thereafter, an end portion of the honeycomb formed body is immersed in a plugging slurry that is slurry materials of a plugging part, and the plugging slurry is filled in the end portion of the cell that should be plugged, to form a plugged part (refer to, for example, Patent Document 1).

In this manufacturing method, as mentioned above, recognition of the position of a cell is made by image recognition. In specific, an image of an end face of a honeycomb formed body having been imaged by e.g., a CCD (charge-coupled device) is binary-processed, and in the case in which a mass of black image in the images of having been binary-processed has a predetermined cell shape (for example, a quadrilateral shape), or reaches a predetermined rate (for example, not less than 80%) of a predetermined cell area, this image is determined to be a cell and the position thereof is recognized. Incidentally, an image that does not have a predetermined cell shape or that does not reach a certain rate of a predetermined cell area is determined to be a foreign substance such as dust that sticks to the end face of the honeycomb formed body, and punching is arranged not to be erroneously made in this position.

However since among cells, a cell that is positioned at the most outer peripheral portion of a honeycomb formed body (cell adjacent to the outer peripheral wall of the honeycomb formed body), as compared to the other cells, is shaped to be partially deformed, as well as has a smaller area, in the above-mentioned image processing, there are some cases in which its position is not recognized as a cell. Thus, even if the cell is the one that has to be plugged, no punching is made in the position corresponding to the cell of the sheet and a plugging slurry is not filled in the cell, so that as a result, a plugged part is not formed and a cell which both end portions are left to be open will remain.

In such cells which both end portions remain to be open, since most particulates in an exhaust gas having flowed therein are not caught, but pass through the filter, the presence of the cell will cause the reduction of the performance as a filter.

Incidentally, a honeycomb formed body to be supplied in manufacturing a plugged honeycomb structure by forming a plugged part is normally formed using a die for extrusion forming as illustrated in FIG. 4. This die 41 for extrusion forming includes: a honeycomb forming die 2 having the structure that there is provided at the surface a groove-like slit 4 in a form of a cell block 5 and there is provided at the backside a clay introduction hole (back hole) 6 in communication with the slit 5; and a frame-shaped presser plate 3 that is disposed at the outer peripheral portion of the honeycomb forming die 2 and regulates the shape and dimension of the honeycomb formed body, and forming clay having been supplied from the backside is introduced into the honeycomb forming die 2 from the clay introduction hole 6 and extruded from the surface of the honeycomb forming die 2 through the slit 4, to be a honeycomb formed body (refer to, for example, Patent Document 2).

As mentioned above, in comparison with the other cells, a cell that is positioned at the most outer peripheral portion having a partly deformed shape (hereinafter, in some cases, it may be referred to as "imperfect cell"), among cell blocks of the honeycomb forming die 2, in the extrusion direction of the forming clay, is formed by the clay having passed around a cell block 5' which end face 5a' is positioned to be overlapped with an inner circumferential surface 3a of a presser plate 3. In the conventional die 41 for extrusion forming as illustrated in FIG. 4, all the cell blocks 5 and 5' at least a part of which end faces 5a and 5a' are resided inside the inner circumferential surface 3a of the presser plate 3 have the same length, that is, it is general that the end faces 5a and 5a' of these cell blocks 5 and 5' are present in the same plane.

[Patent Document 1] Japanese Patent Application Laid-Open No. 2001-300922

[Patent Document 2] Japanese Patent Application Laid-Open No. 2003-285308

DISCLOSURE OF THE INVENTION

The present invention has been made in view of the above-described problems of conventional techniques, and has an object of the present invention is to provide a honeycomb formed body in which each cell has a predetermined shape and dimension, and there is present no cell having the shape and dimension that is different from a predetermined shape and dimension as mentioned above at the most outer peripheral portion.

To achieve the above-mentioned object, according to the present invention, provided are the following die for extrusion forming, a method of forming a honeycomb formed body and a honeycomb formed body.

[1] A die for extrusion forming (a first die for extrusion forming) for extrusion forming of a honeycomb formed body comprising a honeycomb forming die having a structure that there is provided at a surface a groove-like slit in a form of a cell block as well as there is provided at a backside a clay introduction hole in communication with the slit; and a frame-shaped presser plate that is disposed at an outer peripheral portion of the honeycomb forming die and that regulates a shape and dimension of a honeycomb formed body, wherein among the cell blocks, in an extrusion direction of forming clay, a cell block whose end face is positioned to be overlapped with an inner circumferential surface of the presser plate is formed to be shorter than the other cell blocks resided inside the inner circumferential surface of the presser plate.

[2] The die for extrusion forming according to [1], wherein among the cell blocks, in an extrusion direction of forming clay, a cell block whose end face is positioned to be overlapped with an inner circumferential surface of the presser plate is formed to be not less than 1.0 mm shorter than the other cell blocks resided inside the inner circumferential surface of the presser plate.

[3] A die for extrusion forming (a second die for extrusion forming) for extrusion forming of a honeycomb formed body comprising a honeycomb forming die having a structure that there is provided at a surface a groove-like slit in a form of a cell block as well as there is provided at a backside a clay introduction hole in communication with the slit, and a frame-shaped presser plate that is disposed at an outer peripheral portion of the honeycomb forming die and that regulates a shape and dimension of a honeycomb formed body, in which the cell blocks are in the state of being surrounded by an inner circumferential surface of the presser plate at the periphery, as well as in which an end face of a cell block positioned at the most outer peripheral portion differs from the inner circumferential surface of the presser plate by a distance corresponding to a thickness of an outer peripheral wall of the honeycomb formed body and is shaped to be along the inner circumferential surface of the presser plate, wherein among the cell blocks positioned at the most outer peripheral portion, a cell block having an end face shape that is different from that of the other cell blocks resided inside the cell block is formed to be shorter than the other cell blocks resided inside the cell block.

[4] The die for extrusion forming according to [3], wherein among the cell blocks positioned at the most outer peripheral portion, a cell block having an end face shape that is different from that of the other cell blocks resided inside the cell block is formed to be not less than 1.0 mm shorter than the other cell blocks resided inside the cell block.

[5] A method of forming a honeycomb formed body conducting an extrusion forming of a honeycomb formed body using a die for extrusion forming according to any one of [1] to [4].

[6] A honeycomb formed body in which a plurality of cells in communication between two end faces are defined and formed by a partition wall, wherein each cell has a predetermined shape and dimension, and there is present no cell having the shape and dimension that is different from the predetermined shape and dimension at the most outer peripheral portion.

[7] The honeycomb formed body according to [6] that is formed by a forming method according to [5].

In case of forming a honeycomb formed body using a die for extrusion forming according to the present invention, it is possible to obtain a honeycomb formed body in which each cell has a predetermined shape and dimension and there is present no cell having the shape and dimension that is different from the predetermined shape and dimension at the most outer peripheral portion. In the honeycomb formed body having such structure, since there is present no imperfect cell that is hard to be recognized in image recognition, in the case of plugging of one end portion of each cell for the purpose of use in applications such as a diesel particulate filter (DPF), it is possible to recognize with accuracy the position of each cell by image processing and to form a plugged part almost surely at the end portion of the cell intended to be plugged.

DESCRIPTIONS OF REFERENCE NUMERALS

1: die for extrusion forming, 2: honeycomb forming die, 3: presser plate, 3a: inner circumferential surface, 4: slit, 5: cell block, 5': cell block, 5a: end face, 5a': end face, 6: clay introduction hole, 7: gap, 8: spacer, 9: spacer, 10: portion indicated by dotted lines, 11: die for extrusion forming, 12: honeycomb forming die, 13: presser plate, 13a: inner circumferential surface, 14: slit, 15: cell block, 15': cell block, 15a: end face, 15a': end face, 16: clay introduction hole, 18: space, 19: spacer, 21: extrusion passage, 31: plugged honeycomb structure, 32: honeycomb structure, 33: end face, 35: end face, 37: partition wall, 39: cell, 40: plugged part, 41: die for extrusion forming

DESCRIPTION OF THE PREFERRED EMBODIMENT

Hereinafter, typical preferred embodiments according to the present invention will be specifically described, but the present invention should not be limited to the following embodiments. It should be appreciated that modifications, improvements and the like of designs could be added as appropriate based on normal knowledge of persons skilled in the art without departing from the inventive concepts thereof.

Figure 1:
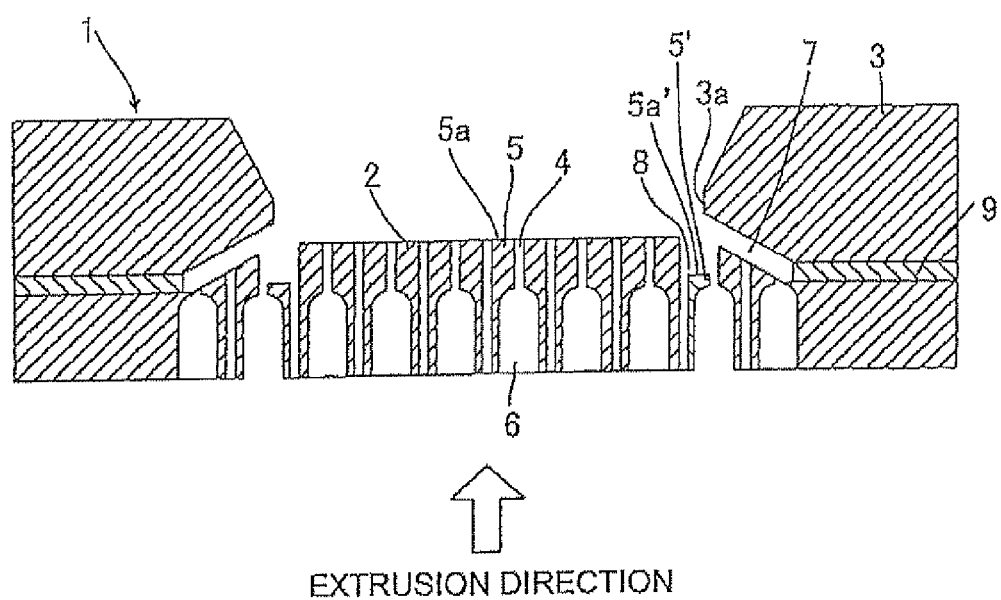
FIG. 1 is a schematically sectional view illustrating one example of an embodiment of a first die for extrusion forming according to the present invention.

FIG. 1 is a schematically sectional view illustrating one example of an embodiment of a first die for extrusion forming according to the present invention. A first die 1 for extrusion forming according to the present invention includes a honeycomb forming die 2 and a presser plate 3. The honeycomb forming die 2 has the structure that there is provided at the surface a groove-like slit 4 in a form of a cell block 5, as well as there is provided at the backside a clay introduction hole (back hole) 6 in communication with the slit 4. The presser plate 3 is a frame-shaped member for regulating the shape and dimension of a honeycomb formed body, and disposed at the outer peripheral portion of the honeycomb forming die 2 via a spacer 9.

Figure 4:
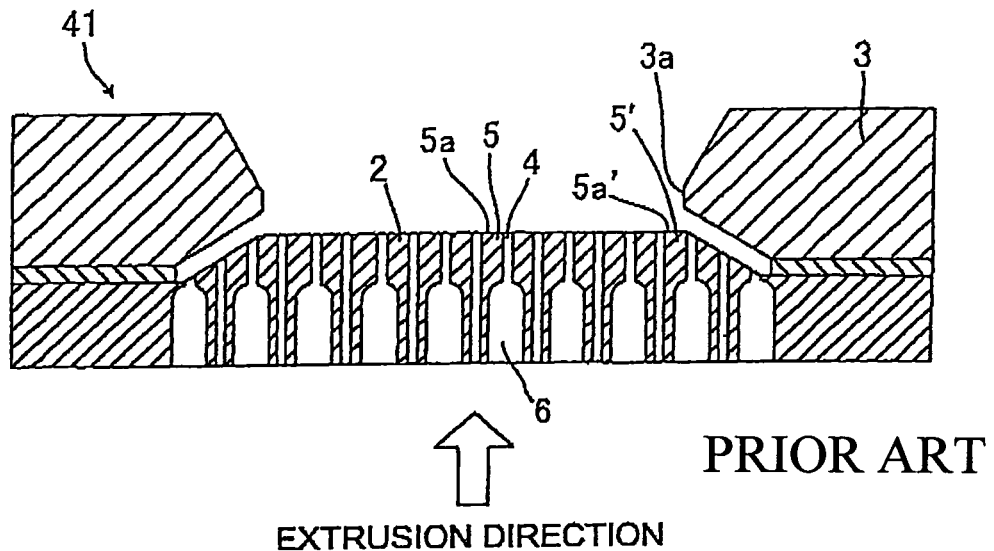
FIG. 4 is a schematically sectional view illustrating one example of an embodiment of a conventional die for extrusion forming.

The cell block 5 is a columnar part having the same sectional shape as that of a cell of a honeycomb formed body to be manufactured by extrusion forming, and a cell is defined and formed by a partition wall that is made of clay having passed through the slits 4 therearound to be extruded. As described above, in a conventional die 41 for extrusion forming as illustrated in FIG. 4, all the cell blocks 5 and 5' at least a part of whose end faces 5a and 5a' is positioned inside an inner circumferential surface 3a of the presser plate 3 have the same length, and all the end faces of these cell blocks 5 and 5' are in the same plane.

Figure 5:
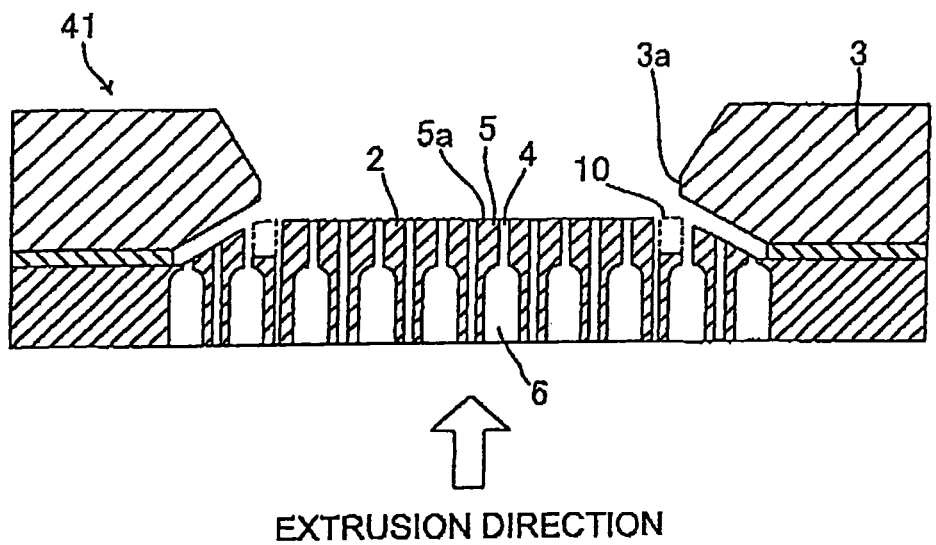
FIG. 5 is a schematically sectional view illustrating one example of an embodiment of a conventional die for extrusion forming.
Figure 6A:
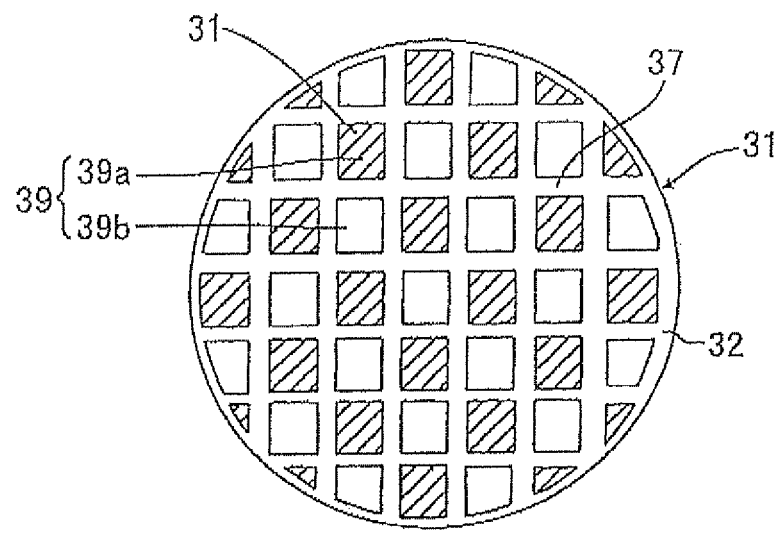
FIG. 6A is a schematic plan view taken from one end face side illustrating a basic structure of a plugged honeycomb structure.
Figure 6B:
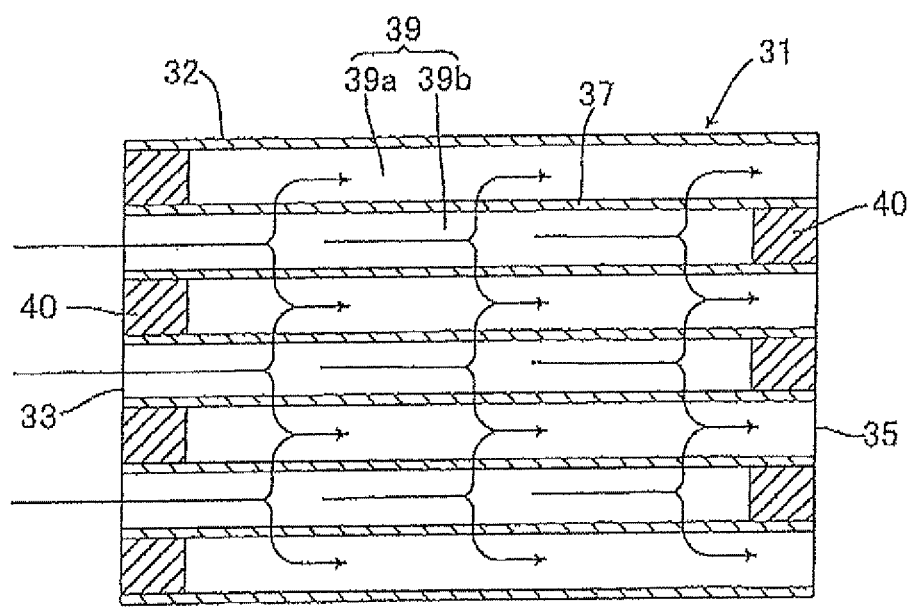
FIG. 6B is a schematically sectional view illustrating a basic structure of a plugged honeycomb structure.

Whereas, the first die for extrusion forming according to the present invention is characterized in its structure that of cell blocks of the honeycomb forming die 2, in an extrusion direction of forming clay, the cell block 5' whose end face 5a' is positioned to be overlapped with the inner circumferential surface 3a of the presser plate 3 is formed to be shorter than the other cell blocks 5 that are resided inside the inner circumferential surface 3a of the presser plate 3. That is, this cell block 5' is in the state in which its end face 5' is not in the same plane with the end face 5a of the other cell blocks 5, and viewed from the surface of the honeycomb forming die 2, recessed in a direction opposite to the extrusion direction. More specifically, in the die 41 for extrusion forming of a conventional structure illustrated in FIG. 5, it is in the state in which a portion indicated by dotted lines 10 of a cell block whose end face is positioned to be overlapped with the inner circumferential surface 3a of the presser plate 3 is removed, and by removal of the portion 10 indicated by dotted lines, in the first die 1 for extrusion forming according to the present invention, there is formed a space 8 that is absent in the die for extrusion forming of the conventional structure as is illustrated in FIG. 1

In forming of a honeycomb formed body using such the first die 1 or extrusion forming, forming clay having been supplied from the backside of the honeycomb forming die 2 is introduced into the honeycomb forming die 2 from the clay introduction hole 6, and extruded from the surface of the honeycomb forming die 2 through the slits 4 to be a honeycomb formed body. Incidentally, the clay having been extruded from a gap 7 between the honeycomb forming die 2 and the presser plate 3 mainly forms an outer peripheral wall of a honeycomb formed body. Here, in the case of using the die 41 for extrusion forming of the conventional structure, with the clay having passed around the cell block 5' whose end face 5' is positioned to be overlapped with the inner circumferential surface 3a of the presser plate 3, an imperfect cell will be formed; while in the case of using the first die 1 for extrusion forming according to the present invention, since the cell block 5' whose end face 5a' is positioned to be overlapped with the inner circumferential surface 3a of the presser plate 3 is formed to be shorter, whereby the space 8 is formed at an extended portion of the cell block 5', the clay having passed around the cell block 5' flows in the space 8 from the end portion of the cell block 5', and with the clay having flowed in this space 8, the cell which would have conventionally been an imperfect cell is extruded in the blocked state, as a result to be able to obtain a honeycomb formed body in which no imperfect cell is present.

In the first die for extrusion forming according to the present invention, it is preferred that among the cell blocks of the honeycomb forming die 2, in the extrusion direction of forming clay, the cell block 5' whose end face 5a' is positioned to be overlapped with the inner circumferential surface 3a of the presser plate 3 is formed to be not less than 1.0 mm shorter than the other cell blocks 5 resided inside the inner circumferential surface 3a of the presser plate 3. In case where it is less than 1.0 mm, in some cases, the blockage of a cell may be done imperfectly.

Figure 2A:
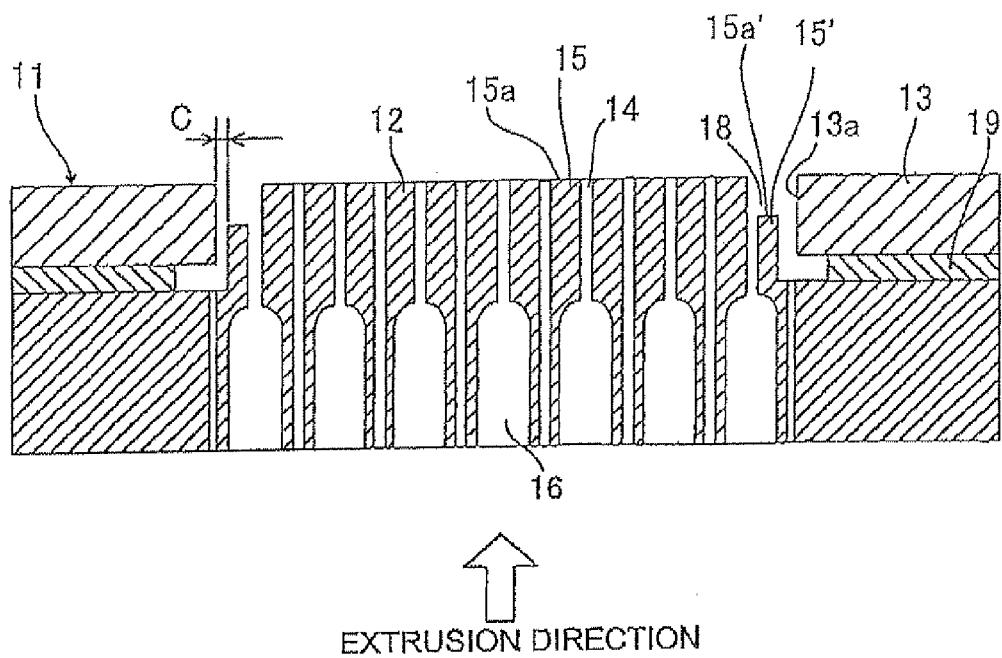
FIG. 2A is a schematically sectional view illustrating one example of an embodiment of a second die for extrusion forming according to the present invention.
Figure 2B:
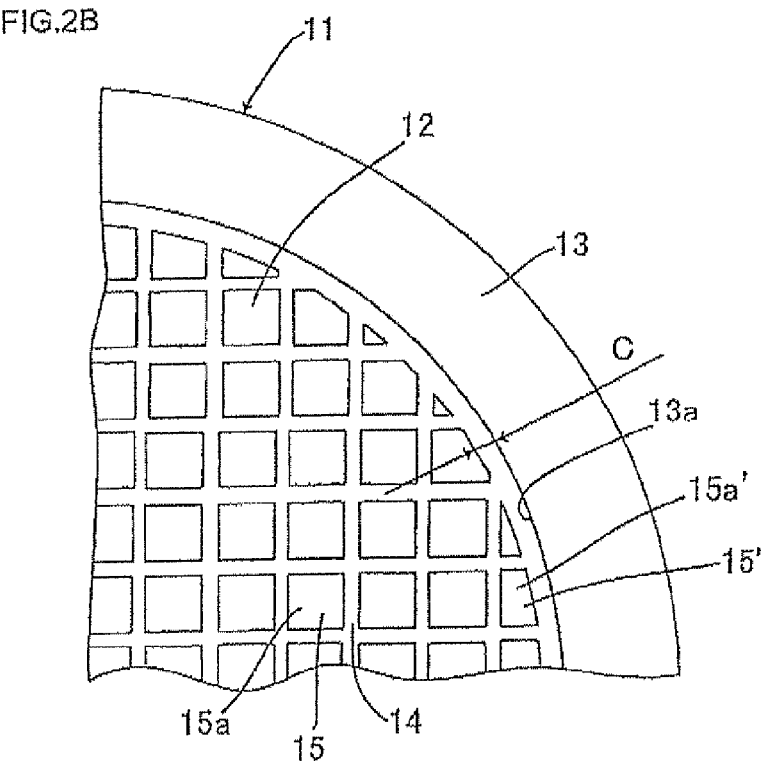
FIG. 2B is a schematically partial plan view illustrating one example of an embodiment of a second die for extrusion forming according to the present invention.

FIGS. 2A and 2B are schematic views illustrating one example of an embodiment of a second die for extrusion forming according to the present invention, and FIG. 2A is a sectional view and FIG. 2B is a partially plan view. A second die 11 for extrusion forming according to the present invention includes a honeycomb forming die 12 and a presser plate 13. The honeycomb forming die 12 has the structure that there is provided at the surface a groove-like slit 14 in a form of a cell block 15, as well as there is provided at the backside a clay introduction hole (back hole) 16 in communication with the slit 14. The presser plate 13 is a frame-shaped member for regulating the shape and dimension of a honeycomb formed body, and disposed at the outer peripheral portion of the honeycomb forming die 12 via a spacer 19. The cell blocks are in the state of being surrounded by the inner circumferential surface 13a of the presser plate 13 at the periphery, as well as the end face of the cell block that is positioned at the most outer peripheral portion differs from the inner circumferential surface 13a of the presser plate 13 by a distance C corresponding to the thickness of the outer peripheral wall of the honeycomb formed body and has the shape along the inner circumferential surface 13a of the presser plate 13.

Further, this second die 11 for extrusion forming is characterized in its structure that among the cell blocks positioned at the most outer periphery of the honeycomb forming die 12, the cell block 15' having an end face shape which is different from that of the other cell blocks 15 that are resided inside the cell block is formed to be shorter than the other cell blocks resided inside the cell block. That is, this cell block 15' is in the state in which its end face 15' is not in the same plane with the end face 15a of the other cell blocks 15, and viewed from the surface of the honeycomb forming die 12, recessed in a direction opposite to the extrusion direction, whereby a space 18 is formed in an extended portion of the cell block 15'.

In forming of a honeycomb formed body using such the second die 11 for extrusion forming, forming clay having been supplied from the backside of the honeycomb forming die 12 is introduced into the honeycomb forming die 12 from the clay introduction hole 16, and extruded from the surface of the honeycomb forming die 12 through the slits 14, to be a honeycomb formed body. Here, assuming that the cell block 15' has the same length as that of the other blocks 15, and no space 18 is formed, with the clay having passed around the cell block 15', an imperfect cell will be formed; while in the second die 11 for extrusion forming according to the present invention, since the cell block 15' is formed to be shorter than the other cell blocks 15, whereby the space 18 is formed in an extended portion of the cell block 15', the clay having passed around the cell block 15' flows in the space 18 from the end portion of the cell block 15', and with the clay having flowed in this space 18, the cell which would have been an imperfect cell is extruded in the blocked state, as a result to be able to obtain a honeycomb formed body in which no imperfect cell is present.

In the second die 11 for extrusion forming according to the present invention, it is preferred that among the cell blocks positioned at the most outer peripheral portion, the cell block 15' having an end face shape that is different from that of the other cell blocks 15 resided inside the cell block is formed to be not less than 1.0 mm shorter than the other cell blocks 15 resided inside the cell block. In case where it is less than 1.0 mm, in some cases, the blockage of a cell may be done imperfectly.

Figure 3:
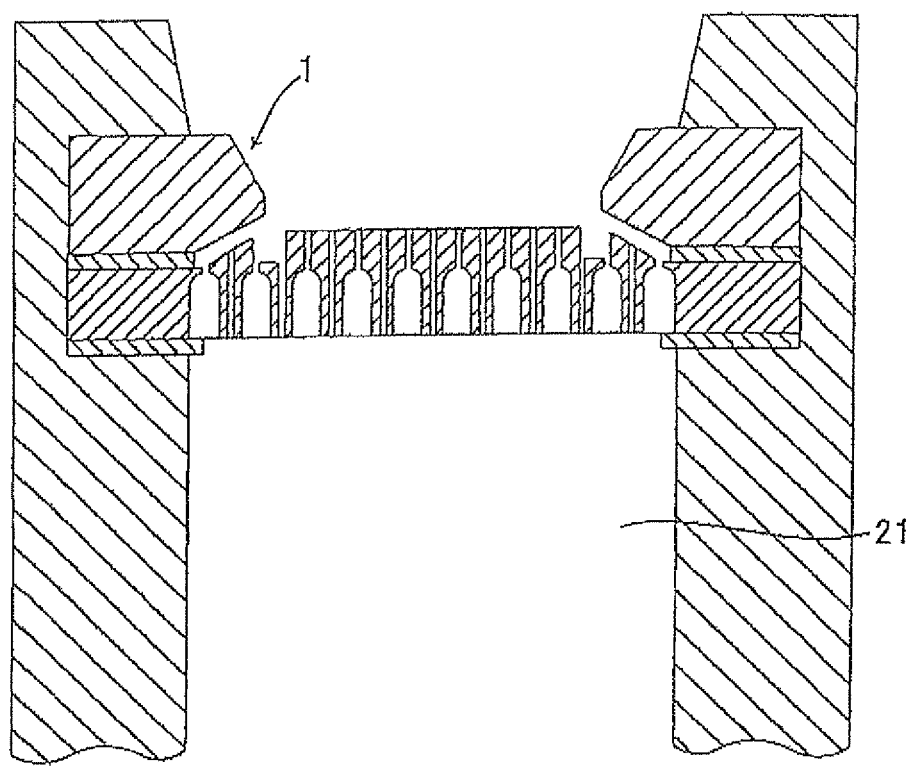
FIG. 3 is a schematically sectional view illustrating one example of an embodiment of a forming method according to the present invention.

A method of forming a honeycomb formed body according to the present invention is to conduct extrusion forming of a honeycomb formed body using the first die for extrusion forming or the second die for extrusion forming according to the present invention. That is, as illustrated in FIG. 3, in an extrusion passage 21 of an extrusion forming apparatus, the first die 1 for extrusion forming according to the present invention (or the second die 11 for extrusion forming) is mounted, and forming clay is supplied in the passage 21 and made to pass through the die 1 for extrusion forming (or the second die 11 for extrusion forming) according to the present invention, thereby conducting extrusion forming of a honeycomb formed body. In case of forming a honeycomb formed body by this forming method, it is possible to easily obtain a honeycomb formed body in which no imperfect cell is present.

The honeycomb formed body according to the present invention is a honeycomb formed body in which a plurality of cells to be in communication between two end faces are defined and formed by partition walls, and characterized in that each cell has a predetermined shape and dimension, and there is present at the most outer peripheral portion no cell having the shape and dimension different from the predetermined shape and dimension. That is, all the cells that are present in the honeycomb formed body according to the present invention have the same shape and dimension, and there is present no imperfect cell which recognition is hard to be done in image recognition. Therefore, in the case of plugging one end portion of each cell for the purpose of use in applications such as DPF, the position of each cell can be recognized with high accuracy by image processing, and a plugged part can be formed almost surely at the end portion of a cell intended to be plugged. It is possible to easily form such a honeycomb formed body by using the forming method according to the present invention.

EXAMPLE

Hereinafter, although the present invention will be described in further detail based on examples, the present invention is not limited to these examples.

Example 1

Figure 7:
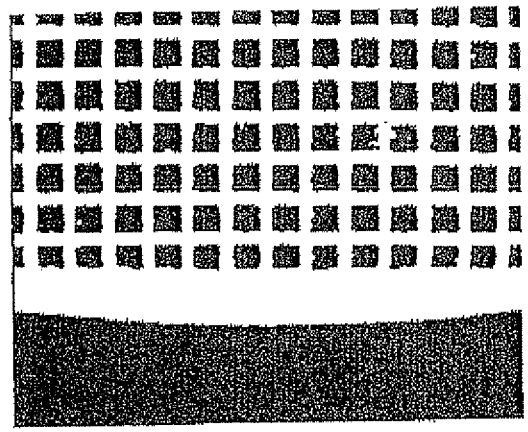
FIG. 7 is a partially enlarged photograph illustrating a principal portion of a honeycomb formed body obtained in Example 1.
Figure 8:
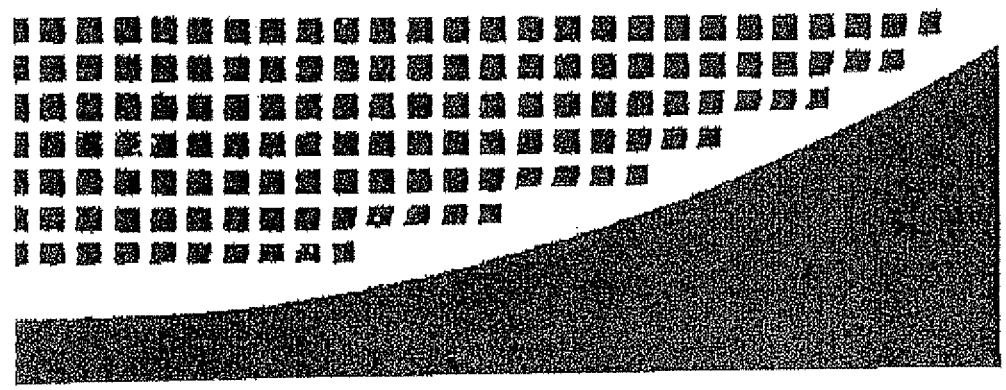
FIG. 8 is a partially enlarged photograph illustrating a principal portion of a honeycomb formed body obtained in Example 1.

As illustrated in FIG. 1, using the first die for extrusion forming which includes a honeycomb forming die 2 having the structure that there is provided at the surface a groove-like slit 4 in a form of a cell block 5 as well as there is provided at the backside a clay introduction hole 6 in communication with the slit 4; and a frame-shaped presser plate 3 that is disposed at the outer peripheral portion of this honeycomb forming die 2, and regulates the shape and dimension of the honeycomb formed body, and in which among the cell blocks, in an extrusion direction of forming clay, a cell block 5' whose end face 5a' is positioned to be overlapped with an inner circumferential surface 3a of the presser plate 3 is formed to be 1.0 mm shorter than the other cell blocks 5 resided inside the inner circumferential surface 3a of the presser plate 3, extrusion forming of a honeycomb formed body was made. As forming clay, 100 parts by mass of raw material powder that contains talc, kaolin, alumina and silica was added with 5 parts by mass of methyl cellulose acting as a binder and 25 parts by mass of water, a mixture of substances was kneaded using a kneader, and the resulting material was used. In the honeycomb formed body having been obtained in such way, as illustrated in a partly enlarged photograph of FIGS. 7 and 8, each cell had a predetermined shape and dimension, and no imperfect cell was present at the most outer peripheral portion.

Example 2

As illustrated in FIGS. 2A and 2B, using the second die for extrusion forming according to the present invention which includes a honeycomb forming die 12 having the structure that there is provided at the surface a groove-like slit 14 in a form of a cell block 15 as well as there is provided at the backside a clay introduction hole 16 in communication with the slit 14; and a frame-shaped presser plate 13 that is disposed at the outer periphery of this honeycomb forming die 12, and regulates the shape and dimension of the honeycomb formed body, in which the cell blocks are in the state of being surrounded by an inner circumferential surface 13a of the presser plate 13 at the periphery, as well as the end face of the cell block positioned at the most outer peripheral portion differs from the inner circumferential surface 13a of the presser plate 13 by a distance C corresponding to the thickness of the outer peripheral wall of the honeycomb formed body and is shaped to be along the inner circumferential surface 13a of the presser plate 13, and in which among the cell blocks positioned at the most outer periphery, a cell block 15' having an end face shape that is different from that of the other cell blocks 15 resided inside the cell block is formed to be 1.0 nm shorter than the other cell blocks 15 resided inside the cell block, extrusion forming of a honeycomb formed body was made. The forming clay employed was the same one as that of the Example 1. In the honeycomb formed body having been obtained in such way, as is the honeycomb formed body obtained in Example 1, each cell had a predetermined shape and dimension, and no imperfect cell was present at the most outer peripheral portion.

Comparative Example

Figure 9:
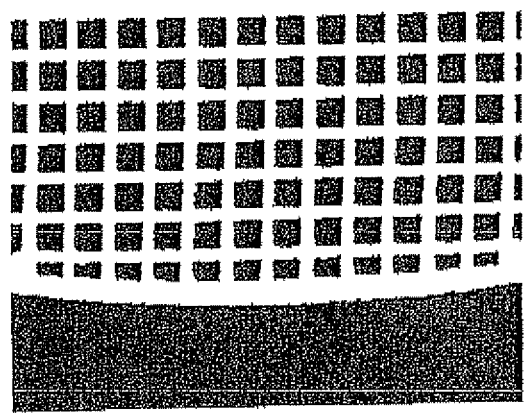
FIG. 9 is a partially enlarged photograph illustrating a principal portion of a honeycomb formed body obtained in Comparative Example.

As illustrated in FIG. 4, using a die for extrusion forming of a conventional structure which includes a honeycomb forming die 2 having the structure that there is provided at the surface a groove-like slit 4 in a form of a cell block 5 as well as there is provided at the backside a clay introduction hole 6 in communication with the slit 4 and a frame-shaped presser plate 3 that is disposed at the outer peripheral portion of this honeycomb forming die 2, and regulates the shape and dimension of the honeycomb formed body, and in which all cell blocks 5 and 5' at least a part of whose end faces 5a and 5a' is resided inside an inner circumferential surface 3a of the presser plate 3 have the same length, extrusion forming of a honeycomb formed body was made. The forming clay employed was the same one as that of the Example 1. In the honeycomb formed body having been obtained in such way, as is illustrated in a partly enlarged photograph of FIG. 9, an imperfect cell was formed at the most outer peripheral portion.

INDUSTRIAL APPLICABILITY

The present invention can be preferably utilized in forming a honeycomb formed body to be used by plugging one end portion of cells, for the purpose of use in application such as DPF.

The invention claimed is:

1. A die for extrusion forming of a honeycomb formed body comprising a honeycomb forming die having a structure that there is provided at a surface a groove-like slit in a form of a cell block as well as there is provided at a backside a clay introduction hole in communication with said slit; and a frame-shaped presser plate that is disposed at an outer peripheral portion of the honeycomb forming die and that regulates a shape and dimension of a honeycomb formed body, wherein among said cell blocks, in an extrusion direction of forming clay, a cell block whose end face is positioned to be overlapped with an inner circumferential surface of said presser plate is formed to be shorter than the other cell blocks resided outside the inner circumferential surface of said presser plate as well as positioned immediately adjacent to the cell block whose end face is positioned to be overlapped with said inner circumferential surface of said presser plate, and an end face of a cell block positioned to be completely overlapped with said presser plate is provided with a tapered incline, whereby a space is formed between the presser plate and the cell block.

2. The die for extrusion forming according to claim 1, wherein among the cell blocks, in an extrusion direction of forming clay, a cell block whose end face is positioned to be overlapped with an inner circumferential surface of the presser plate is formed to be not less than 1.0 mm shorter than the other cell blocks resided inside the inner circumferential surface of said presser plate.

3. A die for extrusion forming of a honeycomb formed body comprising a honeycomb forming die having a structure that there is provided at a surface a groove-like slit in a form of a cell block as well as there is provided at a backside a clay introduction hole in communication with said slit, and a frame-shaped presser plate that is disposed at an outer peripheral portion of the honeycomb forming die and that regulates a shape and dimension of a honeycomb formed body, in which the cell blocks are in the state of being surrounded by an inner circumferential surface of the presser plate at the periphery, as well as in which an end face of a cell block positioned at the most outer peripheral portion differs from the inner circumferential surface of said presser plate by a distance corresponding to a thickness of an outer peripheral wall of the honeycomb formed body and is shaped to be along the inner circumferential surface of the presser plate, wherein among the cell blocks positioned at said most outer peripheral portion, a cell block having an end face shape that is different from that of the other cell blocks disposed inside the most outer peripheral portion is formed to be shorter, in an extrusion direction, than the other cell blocks disposed inside the most outer peripheral portion, whereby a space is formed at an extended portion of the cell block, into which clay having passed from end portions of the cell blocks flows.

4. The die for extrusion forming according to claim 3, wherein among the cell blocks positioned at the most outer peripheral portion, a cell block having an end face shape that is different from that of the other cell blocks disposed inside the most outer peripheral portion is formed to be not less than 1.0 mm shorter than the other cell blocks disposed inside the most outer peripheral portion.

5. A method of forming a honeycomb formed body conducting an extrusion forming of a honeycomb formed body using a die for extrusion forming according to claim 1, comprising extruding the honeycomb formed body from the die.

6. A method of forming a honeycomb formed body conducting an extrusion forming of a honeycomb formed body using a die for extrusion forming according to claim 2, comprising extruding the honeycomb formed body from the die.

7. A method of forming a honeycomb formed body conducting an extrusion forming of a honeycomb formed body using a die for extrusion forming according to claim 3, comprising extruding the honeycomb formed body from the die.

8. A method of forming a honeycomb formed body conducting an extrusion forming of a honeycomb formed body using a die for extrusion forming according to claim 4, comprising extruding the honeycomb formed body from the die.

* * * * *